United States Patent
Zhao et al.

(10) Patent No.: US 11,601,815 B2
(45) Date of Patent: Mar. 7, 2023

(54) METHOD AND DEVICE FOR COMMUNICATION, AND READABLE STORAGE MEDIUM

(71) Applicant: RDA MICROELECTRONICS TECHNOLOGIES (SHANGHAI) CO., LTD., Shanghai (CN)

(72) Inventors: Xingpeng Zhao, Shanghai (CN); Peng Wei, Shanghai (CN); Wei Liu, Shanghai (CN); Mingfang Pan, Shanghai (CN); Chinghwa Yu, Shanghai (CN); Bixiang Hu, Shanghai (CN); Haifeng Zhai, Shanghai (CN)

(73) Assignee: RDA MICROELECTRONICS TECHNOLOGIES (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 16/631,816

(22) PCT Filed: Mar. 6, 2019

(86) PCT No.: PCT/CN2019/077122
§ 371 (c)(1),
(2) Date: Jan. 16, 2020

(87) PCT Pub. No.: WO2020/118919
PCT Pub. Date: Jun. 18, 2020

(65) Prior Publication Data
US 2021/0306859 A1    Sep. 30, 2021

(30) Foreign Application Priority Data
Dec. 14, 2018    (CN) .......................... 201811532495.7

(51) Int. Cl.
*H04L 9/32*    (2006.01)
*H04W 12/50*    (2021.01)
(Continued)

(52) U.S. Cl.
CPC ............ *H04W 12/50* (2021.01); *H04L 67/141* (2013.01); *H04L 67/146* (2013.01); *H04W 12/03* (2021.01); *H04W 12/04* (2013.01); *H04W 76/11* (2018.02)

(58) Field of Classification Search
CPC ..... H04W 12/50; H04W 12/55; H04W 76/10; H04W 76/11
(Continued)

(56) References Cited

U.S. PATENT DOCUMENTS

| | | | |
|---|---|---|---|
| 2007/0036358 A1* | 2/2007 | Nguyen | ................. H04L 63/18 380/270 |
| 2010/0164685 A1* | 7/2010 | Pering | ..................... G10L 17/00 340/5.83 |

(Continued)

FOREIGN PATENT DOCUMENTS

| | | |
|---|---|---|
| CN | 102685096 A | 9/2012 |
| CN | 103957593 A | 7/2014 |

(Continued)

OTHER PUBLICATIONS

The State Intellectual Property Office of People's Republic of China: Second Office Action for Chinese Application No. 201811532495.7 dated Sep. 8, 2020; 12 pages, including English translation.

(Continued)

*Primary Examiner* — Jeffrey C Pwu
*Assistant Examiner* — Samuel Ambaye
(74) *Attorney, Agent, or Firm* — Schwabe, Williamson & Wyatt, PC (57) ABSTRACT

A communication method, a communication device, and a readable storage medium, wherein the communication method includes: establishing a communication connection with a data source device; establishing a second wired
(Continued)

connection with at least one other device; and exchanging identification information with the at least one other device through the second wired connection, thereby the at least one other device receiving communication data sent from the data source device according to the received identification information. With the above method, multi-device communication is performed quickly and reliably.

18 Claims, 3 Drawing Sheets

(51) Int. Cl.
*H04W 76/11* (2018.01)
*H04W 12/03* (2021.01)
*H04L 67/141* (2022.01)
*H04L 67/146* (2022.01)
*H04W 12/04* (2021.01)

(58) Field of Classification Search
USPC ........................................................ 713/168
See application file for complete search history.

(56) References Cited

U.S. PATENT DOCUMENTS

| | | |
|---|---|---|
| 2012/0198531 A1 | 8/2012 | Ort |
| 2014/0112410 A1 | 4/2014 | Yokoyama |
| 2016/0286530 A1* | 9/2016 | Ishimura ................. H04L 69/40 |
| 2017/0208630 A1* | 7/2017 | Liu ........................ H04W 76/40 |
| 2018/0109949 A1* | 4/2018 | Fujii ....................... H04L 63/08 |

FOREIGN PATENT DOCUMENTS

| | | |
|---|---|---|
| CN | 104620552 A | 5/2015 |
| CN | 106028466 A | 10/2016 |
| CN | 106992998 A | 7/2017 |
| CN | 107770356 A | 3/2018 |
| CN | 108322443 A | 7/2018 |
| CN | 108573162 A | 9/2018 |
| WO | 2013/126737 A1 | 8/2013 |

OTHER PUBLICATIONS

International Search Report and Written Opinion for PCT/CN2019/077122 dated Sep. 4, 2019; 8 pages. No English translation available.
The State Intellectual Property Office of People's Republic of China: First Office Action in Chinese Patent Application No. 201811532495.7 dated Mar. 4, 2020; 15 pages.

* cited by examiner

METHOD AND DEVICE FOR COMMUNICATION, AND READABLE STORAGE MEDIUM

CROSS-REFERENCE TO RELATED APPLICATION

This application is a national phase entry under 35 U.S.C. § 371 of International Application No. PCT/CN2019/077122, filed Mar. 6, 2019, which designates the United States of America, which claims the benefit of priority to Chinese Patent Application No. 201811532495.7, filed on Dec. 14, 2018, and entitled "METHOD AND DEVICE FOR COMMUNICATION, AND READABLE STORAGE MEDIUM". The entire contents of these applications are hereby incorporated herein by reference.

TECHNICAL FIELD

The present disclosure relates to a telecommunication field, and more particularly, to a communication method, a communication device, and a readable storage medium.

BACKGROUND

In a communication between a single device and multiple devices or the communication between multiple devices and multiple devices, safe and effective exchange of identification information between a data source device and a target device, sharing communication information among multiple target devices, and sharing the communication information between the target device and the data source device(s) among multiple target devices become the key to establish such communication.

In a conventional technology, wirelessly distributing and exchanging information between a data source device and a target device, or between multiple target devices, has the problems of slow speed, poor anti-interference ability, easy interception, and poor security.

SUMMARY

The embodiment of the disclosure provides a way for fast and reliable multi-device communication.

Embodiments of the present disclosure provide a communication method, including: establishing a communication connection with a data source device; establishing a second wired connection with at least one other device; and exchanging identification information with the at least one other device through the second wired connection, thereby the at least one other device receiving communication data sent from the data source device according to the received identification information.

In some embodiments, after exchanging identification information with the at least one other device through the second wired connection, the communication method further includes: establishing a second wireless connection with the at least one other device according to the identification information of the at least one other device, and communicating with the at least one other device through the second wireless connection.

In some embodiments, after exchanging identification information with the at least one other device through the second wired connection, the communication method further includes: after establishing a second wireless connection with the at least one other device, encrypting a data link of the second wireless connection according to the identification information of the at least one other device, and communicating with the at least one other device through the encrypted second wireless connection.

In some embodiments, the communication connection established with the data source device is a first wireless connection; and after exchanging identification information with the at least one other device through the second wired connection, the communication method further includes: obtaining identification information of the data source device; and transmitting the identification information of the data source device to the at least one other device through the second wired connection, thereby the at least one other device receiving the communication data sent from the data source device through the first wireless connection according to the received identification information.

In some embodiments, the communication connection established with the data source device is a first wireless connection; and after exchanging identification information with the at least one other device through the second wired connection, the communication method further includes: obtaining identification information of the data source device; transmitting the identification information of the data source device to the at least one other device through the second wired connection; and sharing the first wireless connection with the at least one other device according to the identification information of the at least one other device and the identification information of the data source device.

In some embodiments, sharing the first wireless connection with the at least one other device according to the identification information of the at least one other device and the identification information of the data source device includes at least one of following: a target device and the at least one other device communicating with the data source device in turn; and the target device and the at least one other device communicating with the data source device simultaneously.

In some embodiments, the identification information of the data source includes at least one of the following: an identification code of the data source device, a physical address of the data source device, an encryption key of the data source device, a timing of the first wireless connection, frequency hopping information of the first wireless connection and an encryption key of the first wireless connection.

In some embodiments, after transmitting the identification information of the data source device to the at least one other device through the second wired connection, the communication method further includes: disconnecting the second wired connection.

In some embodiments, establishing the communication connection with a data source device includes: establishing a first wired connection with the data source device; exchanging identification information with the data source device through the first wired connection; and establishing a first wireless connection with the data source device according to the identification information of the data source device.

In some embodiments, establishing a first wireless connection with the data source device according to the identification information of the data source device includes: encrypting a data link of the first wireless connection according to the identification information of the data source.

In some embodiments, after exchanging the identification information with the data source device through the first wired connection, the communication method further includes: disconnecting the first wired connection.

In some embodiments, after exchanging identification information with the at least one other device through the second wired connection, the communication method further includes: disconnecting the second wired connection.

In some embodiments, the identification information includes at least one of the following: an identification code of a communication device, a physical address of the communication device, and an encryption key of the communication device; and the identification information of the at least one other device includes at least one of the following: an identification code of the at least one other device, a physical address of the at least one other device, and an encryption key of the at least one other device.

Embodiments, of the present disclosure provide a communication device, including: a communicating circuitry, configured to establish a communication connection with a data source device; a second wired connection circuitry, configured to establish a second wired connection with at least one other device; and a second exchanging circuitry, configured to exchange identification information with the at least one other device through the second wired connection, thereby the at least one other device receiving communication data sent from the data source device according to the received identification information.

In some embodiments, the communicating circuitry is further configured to establishing a second wireless connection with the at least one other device according to the identification information of the at least one other device, and communicating with the at least one other device through the second wireless connection.

In some embodiments, after establishing a second wireless connection with the at least one other device, the communicating circuitry is further configured to encrypt a data link of the second wireless connection according to the identification information of the at least one other device, and communicate with the at least one other device through the encrypted second wireless connection.

In some embodiments, the communication connection established by the communicating circuitry with the data source device is a first wireless connection; wherein the second exchanging circuitry is further configured to obtain identification information of the data source device; and transmit the identification information of the data source device to the at least one other device through the second wired connection, thereby the at least one other device receiving the communication data sent from the data source device through the first wireless connection according to the received identification information.

In some embodiments, the communication connection established by the communicating circuitry with the data source device is a first wireless connection; wherein the second exchanging circuitry is further configured to obtain identification information of the data source device; transmit the identification information of the data source device to the at least one other device through the second wired connection; and share the first wireless connection with the at least one other device according to the identification information of the at least one other device and the identification information of the data source device.

In some embodiments, the second exchanging circuitry is further configured to share the first wireless connection with the at least one other device according to the identification information of the at least one other device and the identification information of the data source device, which includes at least one of following: a target device and the at least one other device communicating with the data source device in turn; and the target device and the at least one other device communicating with the data source device simultaneously.

In some embodiments, the identification information of the data source includes at least one of the following: an identification code of the data source device, a physical address of the data source device, an encryption key of the data source device, a timing of the first wireless connection, frequency hopping information of the first wireless connection and an encryption key of the first wireless connection.

In some embodiments, the second exchanging circuitry is further configured to disconnect the second wired connection.

In some embodiments, the communication device further includes: a first wired connection circuitry, configured to establish a first wired connection with the data source device; a first exchanging circuitry, configured to identification information with the data source device through the first wired connection; and the communicating circuitry is further configured to establish a first wireless connection with the data source device according to the identification information of the data source device.

In some embodiments, the communicating circuitry is configured to encrypt a data link of the first wireless connection according to the identification information of the data source.

In some embodiments, the first exchanging circuitry is further configured to disconnect the first wired connection.

In some embodiments, the second exchanging circuitry is further configured to disconnect the second wired connection.

In some embodiments, the identification information includes at least one of the following: an identification code of a communication device, a physical address of the communication device, and an encryption key of the communication device; and the identification information of the at least one other device includes at least one of the following: an identification code of the at least one other device, the physical address of the at least one other device, and an encryption key of the at least one other device.

Embodiments of the present disclosure provide a readable storage medium, including a non-transitory storage medium or a non-transitory storage medium, and storing computer instructions, wherein once the computer instructions are executed, the communication method is performed.

Embodiments of the present disclosure provide a communication device, including a memory and a processor, wherein the memory stores computer instructions executable on the processor, and the processor executes the communication method.

Embodiments of the present disclosure have following benefits.

Since the identification information is exchanged with the at least one other device through the second wired connection, the at least one other device may receive the communication data sent from the data source device according to the received identification information. Therefore, the at least one other device may participate in communication between the target device and the data source device to perform multi-device communication quickly and reliably.

Further, the first wired connection is established with the data source device. The identification information is exchanged with the data source device through the first wired connection. A first wireless connection with the data source device according to the identification information of the data source device. Identification information is exchanged with the at least one other device through the second wired connection, accordingly the at least one other device receives the communication data sent from the data source device according to the received identification information. Since the target device exchanges the identification information with the data source device through the first wired connection, the identification information acquired by the target device and the data source device is highly secure, and the first wireless connection established through the identification information has a high security level. Similarly, since the target device exchanges the identification information with the at least one other device through the second wired connection, the identification information acquired by the target device and the at least one other device has a high security level. Further, the at least one other device can receive the communication data sent from the data source device according to the corresponding identification information on a basis of high security. Therefore, it ensures fast, reliable, and secure wireless communication between the target device and the data source device and between the target device and the at least one other device.

DETAILED DESCRIPTION

In a conventional technology, wirelessly distributing and exchanging information between a data source device and a target device, or between multiple target devices, has the problems of slow speed, poor anti-interference ability, easy interception, and poor security.

In embodiments of the present disclosure, since the identification information is exchanged with at least one other device through the second wired connection, the at least one other device may receive the communication data sent from the data source device according to the received identification information. Therefore, the at least one other device can participate in communication between the target device and the data source device to perform multi-device communication quickly and reliably.

In order that the above objects, characteristics and advantages of the present disclosure become more apparent, and embodiments of the present disclosure are described in detail with reference to the drawings.

Figure 1:
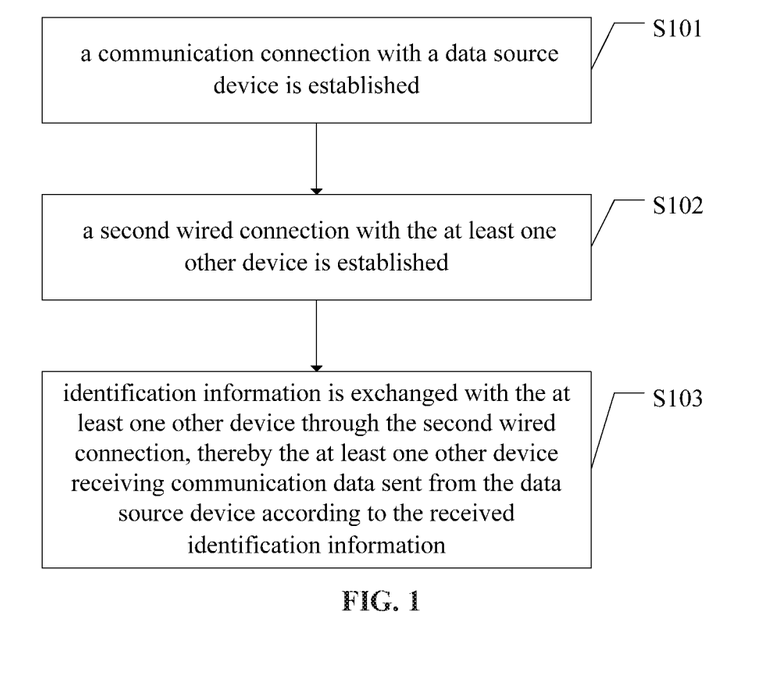
FIG. 1 schematically illustrates a flow diagram of a communication method according to an embodiment of the present disclosure.

Embodiments of the present disclosure provide a communication method, referring to FIG. 1, the communication method is explained in detail with specific steps.

In S101, a communication connection with a data source device is established.

In some embodiments, the process of establishing a communication connection between a target device and the data source device may include: establishing a first wired connection with the data source device; exchanging identification information with the data source device through the first wired connection; and establishing a first wireless connection with the data source device according to the identification information of the data source device, that is, communicating with the data source device through the first wireless connection.

In a practical application, the identification information of the data source may include at least one of the following: an identification code of the data source device, a physical address of the data source device, and an encryption key of the data source device.

Figure 2:
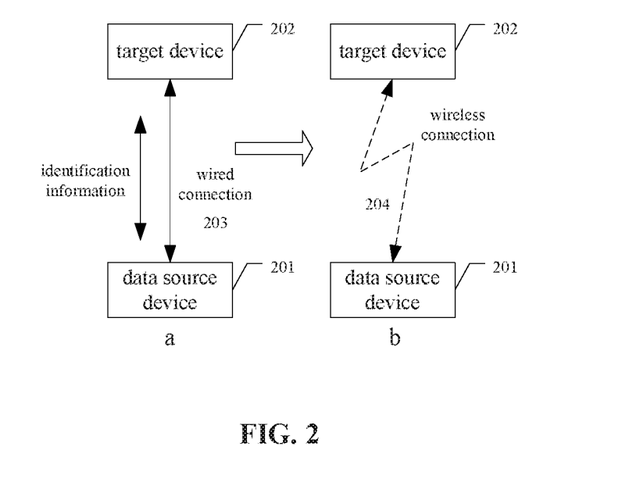
FIG. 2 schematically illustrates a scenario diagram of a communication method according to an embodiment of the present disclosure.

Referring to FIG. 2, FIG. 2 schematically illustrates a scenario diagram of a communication method according to an embodiment of the present disclosure. In FIG. 2a, the target device 202 first establishes a wired connection 203 with the data source device 201, and then the target device 202 and the data source device 201 exchange identification codes, physical addresses, and encryption keys through the wired connection 203. After the two devices obtain the identification information of the other party, either party disconnects the wired connection 203. In FIG. 2b, the target device 202 and the data source device 201 establish a wireless connection 204 with corresponding identification information. Since the wireless connection 204 is established according to the identification information of both parties, the wireless connection 204 has a high security level.

The target device first establishes a first wired connection with the data source device, and exchanges the identification information with the data source device through the first wired connection. The first wireless connection is established with the data source device according to the identification information of the data source device. Since the target device exchanges the identification information with the data source device through the first wired connection, the identification information acquired by the communication parties is highly secure, so that the first wireless connection established through the identification information has high security level. It ensures fast, reliable and secure wireless communication between the target device and the data source device.

It can be understood that, according to the different needs of different users, the target device may exchange the identification information with the data source device through the first wired connection, and then establish the first wireless connection with high security level based on the identification information to ensure the security of communication between the target device and the data source device. The target device can also directly establish a communication connection with the data source device, and then perform step S102, so that the at least one other device can participate in the communication between the target device and the data source device, which is not described in detail herein.

In some embodiments, the identification information of the target device includes at least one of the following: an identification code of the target device, a physical address of the target device, and an encryption key of the target device; and the identification information of the at least one other device includes at least one of the following: an identification code of the at least one other device, at least one of physical address of the at least one other device, and an encryption key of the at least one other device. It can be understood that the user can select other types of identification information for communication devices according to different needs of the user. As long as the communication devices can establish secure wireless communication according to the identification information, or the established wireless communication is encrypted securely, the type of the identification information is not limited, which is not described in detail herein.

In some embodiments, the target device or the data source device may encrypt a data link of the first wireless connection according to the corresponding identification information. For example, the target device may encrypt the data link of the first wireless connection according to the identification information of the data source device. Accordingly, the security of communication between the data source device and the target device is further ensured.

In some embodiments, after the identification information is exchanged with the data source device through the first wired connection, the first wired connection between the target device and the data source device may be disconnected.

In some embodiments, in accordance with different needs, the user may choose to disconnect the first wired connection after exchanging the identification information with the data source device through the first wired connection, or may continue to keep the first wired connection in a connected status, which is not described in detail herein.

In some embodiments, after the target device exchanges the identification information with the at least one other device through the second wired connection, the target device or the at least one other device may disconnect the second wired connection.

In some embodiments, the first wired connection between the target device and the data source device may be a direct contact connection or an indirect contact connection. When there is the direct contact connection between the target device and the data source device, the two parties can be connected by a wired connection, a magnetic connection, or a plugged connection. When there is the indirect contact connection between the target device and the data source device, the two parties may have a solid conduction connection.

When there is a wired connection between the target device and the data source device, the wired connection between the two parties may be a conducting wire, or a coaxial cable or an optical fiber. When there is an indirect contact connection between the target device and the data source device, a bone conduction or a solid conduction may be used for the connection. The user can select different types of wired connection manners for the connection between the data source device and one or more target devices according to different needs, which is not described in detail herein.

It can be understood that, in accordance with different needs of the user, the data source device and a plurality of target devices can independently exchange the identification information to achieve a multi-device communication, which is not described in detail herein.

In some embodiments, the wireless connection may include at least one of the following: Bluetooth, WIFI, magnetic induction, acoustic communication, and visible light communication.

It is to be understood that, in accordance with different needs of users, different types of wireless connections can be selected, that is, the types of wireless communication are not limited as long as the wireless communication requirements of the users can be satisfied, which is not described in detail herein.

In S102, a second wired connection with the at least one other device is established.

The process of S102 may be referred to the description of the process of establishing the first wired connection between the target device and the data source device in S101, which is not described in detail herein.

In S103, identification information is exchanged with the at least one other device through the second wired connection, thereby the at least one other device receiving communication data sent from the data source device according to the received identification information.

In some embodiments, after the target device exchanges the identification information with the at least one other device through the second wired connection, the target device may establish a second wireless connection with the at least one other device using the identification information of the at least one other device, and communicate with the at least one other device through the second wireless connection. Therefore, the at least one other device may receive the communication data sent from the data source device through the second wireless connection.

In embodiments of the disclosure, the at least one other device can indirectly receive communication data sent from the data source device through the target device, thereby achieving fast and reliable multi-device communication.

In embodiments of the disclosure, the identification information of the communication devices may be securely transmitted through the first wired connection and the second wired connection. Thus, a secure wireless communication can be established between a plurality of non-data-source devices. The target device may establish a second wireless connection with other target devices, or establish a second wireless connection with other devices with different types. Accordingly, the at least one other device may receive communication data of the data source device through the target device, thereby establishing a highly reliable wireless connection with the target device.

In some embodiments, after the target device exchanges the identification information with the at least one other device through the second wired connection, the target device may establish a second wireless connection with the at least one other device first, encrypt the second wireless data link according to the identification information of the at least one other device, and then communicate with the at least one other device through the encrypted second wireless connection.

In embodiments of the disclosure, the at least one other device may indirectly receive communication data sent from the data source device through the encrypted data link with the target device, thereby realizing fast and reliable multi-device communication.

In embodiments of the disclosure, the identification information of the communication device may be securely transmitted through the first wired connection and the second wired connection. Thus, a secure wireless communication can be established between the plurality of non-data-source devices. The target device may establish a second wireless connection which is encrypted with other target devices, or establish a second wireless connection which is encrypted with devices with other different types. Accordingly, the at least one other device may receive communication data of the data source device through the target device, thereby establishing a highly reliable wireless connection with the target device.

In some embodiments, the communication connection established between the target device and the data source device is a first wireless connection. And after the target device exchanges identification information with the at least one other device through the second wired connection, the communication method further includes: obtaining identification information of the data source device; and transmitting the identification information of the data source device to the at least one other device through the second wired connection, thereby the at least one other device receiving the communication data sent from the data source device through the first wireless connection according to the received identification information.

In some embodiments, after the target device transmits the identification information of the data source device to the at least one other device through the second wired connection, the target device or the at least one other device may disconnect the second wired connection.

In some embodiments, the identification information of the data source may include at least one of the following: an identification code of the data source device, a physical address of the data source device, an encryption key of the data source device, a timing of the first wireless connection, frequency hopping information of the first wireless connection and an encryption key of the first wireless connection. It can be understood that, according to different needs of users, the users may select other types of identification information of data source device or other types of identification information of wireless connections between the data source and the target device. As long as the non-data-source communication device can securely receive the communication data of the data source according to the identification information, the type of the identification information is not limited, which is not described in detail herein.

In embodiments of the disclosure, the at least one other device may participate in communication between the target device and the data source device. For example, the at least one other device receives data sent from the data source device in a one-way manner by monitoring the first wireless connection, thereby realizing fast and reliable multi-device communication.

In embodiments of the disclosure, the at least one other device may directly receive the communication data sent from the data source device according to the identification information of the first wireless connection or the identification information of the data source device, to ensure fast, reliable and secure wireless communication between the target device and the data source device, and between the target device and at least one other device.

In some embodiments, the communication connection established between the target device and the data source device is a first wireless connection. And after the target device exchanges identification information with the at least one other device through the second wired connection, the communication method further includes: obtaining identification information of the data source device; transmitting the identification information of the data source device to the at least one other device through the second wired connection; and sharing the first wireless connection with the at least one other device according to the identification information of the at least one other device and the identification information of the data source device.

In some embodiments, after the target device transmits the identification information of the data source device to the at least one other device through the second wired connection, the target device or the at least one other device may disconnect the second wired connection.

In some embodiments, the target device and the at least one other device may communicate with the data source device in turn, and the target device and the at least one other device may communicate with the data source device simultaneously.

In some embodiments, the identification information of the data source includes at least one of the following: an identification code of the data source device, a physical address of the data source device, an encryption key of the data source device, a timing of the first wireless connection, frequency hopping information of the first wireless connection and an encryption key of the first wireless connection. It can be understood that, according to different needs, the user may select other types of identification information of data source devices or other types of identification information of the wireless connection between the data source and the target device. As long as the plurality of non-data-source communication devices can securely share the wireless communication connection with the data source device according to the identification information, the type of the identification information is not limited, which is not described in detail herein.

In embodiments of the present disclosure, the at least one other device can participate in communication between the target device and the data source device, achieving fast and reliable multi-device communication.

In embodiments of the present disclosure, the at least one other device may establish a two-way wireless communication connection with the data source device according to the identification information of the first wireless connection or the identification information of the data source device, and share the two-way wireless communication connection with the plurality of non-data-source communication devices, thereby establishing a highly reliable wireless connection between the at least one other device and the target device, and between the at least one other device and the data source device.

In summary, the target device establishes a second wired connection with the at least one other device, then exchanges identification information with at least one other device other device through the second wired connection, and finally establishes a second wireless connection with the at least one other device or encrypts the data link of the established second wireless connection according to the identification information of the at least one other device. The target device exchanges identification information with the at least one other device through the second wired connection, so that the identification information acquired by the target device and the at least one other device is highly secure, and the second wireless connection established according to the corresponding identification information or the data link of the established second wireless connection encrypted according to the corresponding identification information has high security. While the at least one other device participates in communication between the target device and the data source device, the target device and the at least one other device can keep fast, reliable, and secure wireless communication.

In addition, the target device establishes a second wired connection with the at least one other device, and transmits the identification information of the data source device to the at least one other device through the second wired connection, so that the at least one other device receives the communication data sent from the data source device through the first wireless connection or shares the first wireless connection according to the identification information of the data source device. Since the target device exchanges the identification information with the at least one other device through the second wired connection, the identification information acquired by the communication parties is highly secure. Therefore, the at least one other device receives the communication data sent from the data source device or shares the first wireless connection according to the identification information under a high security condition, the at least one other device receives the communication data sent from data source device or shares the first wireless connection according to the identification information under the high security condition. Therefore, while the at least one other device participates in communication between the target device and the data source device, the data source device, the target device and the at least one other device can keep fast, reliable, and secure wireless communication.

Figure 3:
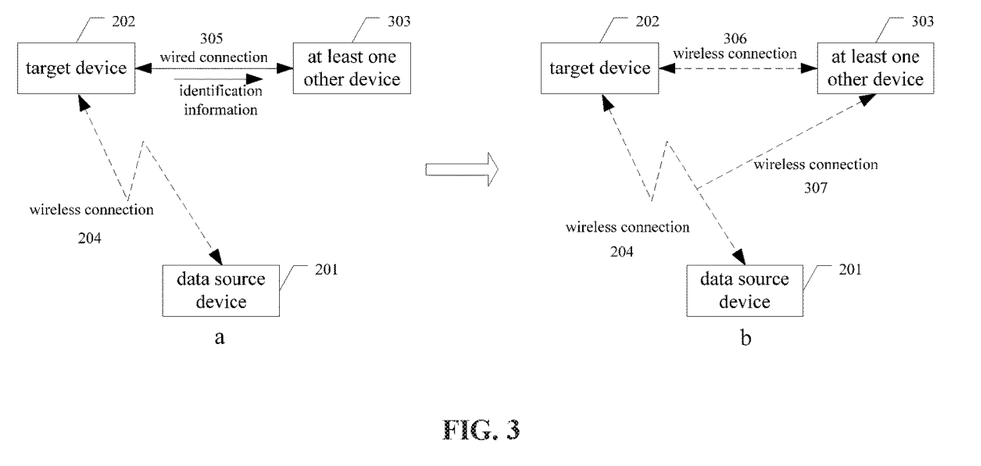
FIG. 3 schematically illustrates a scenario diagram of a communication method according to an embodiment of the present disclosure.

Referring to FIG. 3, FIG. 3 schematically illustrates a scenario diagram of a communication method according to an embodiment of the present disclosure. This scenario is based on the scenario illustrated in FIG. 2, that is, the data source device 201 and the target device 202 have established a secure and efficient wireless connection 204.

In FIG. 3a, during the communication between the target device 202 and the data source device 201 through the wireless connection 204, it is required by the users that the at least one other device 303 also receives the communication data transmitted from the data source device 201. Therefore, the at least one other device 303 first establishes a wired connection 305 with the target device 202, and the at least one other device 303 receives an identification code, a physical address, and an encryption key of the target device 202, and an identification code, a physical address, and an encryption key of the data source device 201 transmitted from the target device 202 through the wired connection 305. Thereafter, the target device 202 disconnects the wired connection 305. Therefore, in FIG. 3b, the at least one other device 303 establishes a wireless connection 306 with the target device 202 according to the identification information of the target device 202, establishes a wireless connection 307 according to the identification information of the data source device 201, and performs a one-way wireless communication to receive communication data transmitted from the source device 201.

In the above process, the at least one other device 303 may select to receive the communication data transmitted from the data source device 201 through the wireless connection 306, or directly receive the communication data transmitted from the data source device 201 through the wireless connection 307. The two methods mentioned above ensure that wireless communication between multiple devices is not easily monitored or intercepted, and has strong anti-interference ability.

Figure 4:
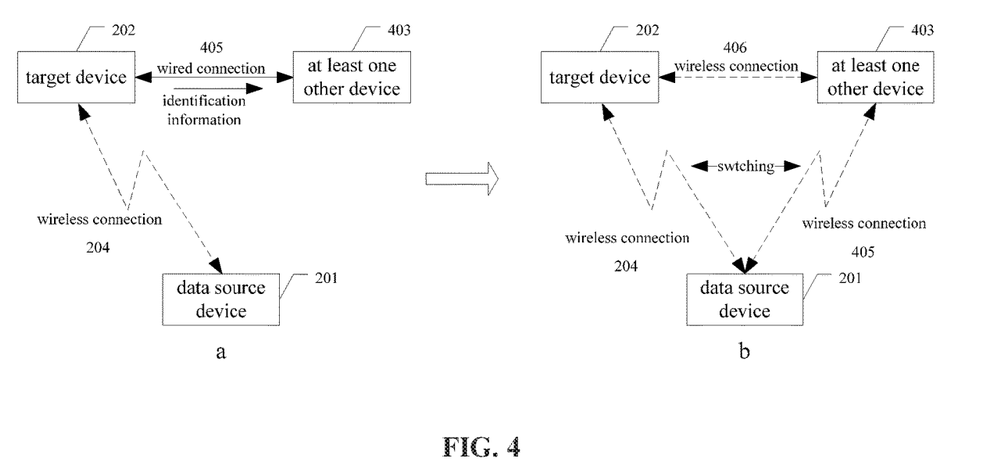
FIG. 4 schematically illustrates a scenario diagram of a communication method according to an embodiment of the present disclosure.

Referring to FIG. 4, FIG. 4 schematically illustrates a scenario diagram of a communication method according to an embodiment of the present disclosure. This scenario is based on the scenario illustrated in FIG. 2, that is, the data source device 201 and the target device 202 have established a secure and efficient wireless connection 204.

In FIG. 4a, during the communication between the target device 202 and the data source device 201 through the wireless connection 204, the at least one other device 403 establishes a wired connection 405 with the target device 202, and receives the identification code, the physical address and the encryption key of the target device, as well as the timing of the wireless connection 204, frequency hopping information, and encryption key the wireless connection 204 transmitted from the target device 202 through the wired connection 405. Thereafter, in FIG. 4b, the at least one other device 403 establishes a wireless connection 406 with the target device 202 according to the identification information of the target device 202; and establishes a wireless connection 405 according to the identification information of the data source device 201. Therefore, the target device 202 and the at least one other device 403 can perform a two-way wireless communication with the data source device 201 in turn through the wireless connection 204 and the wireless connection 405 respectively, thereby ensuring the security and anti-interference ability of the multi-device wireless communication.

In some embodiments, the target device may be a Bluetooth headphone, and the at least one other device may be a Bluetooth speaker. The target device and the at least one other device coordinately play the audio data transmitted from the data source device through the wireless connection respectively, thereby improving the user experience on the basis of ensuring security.

Figure 5:
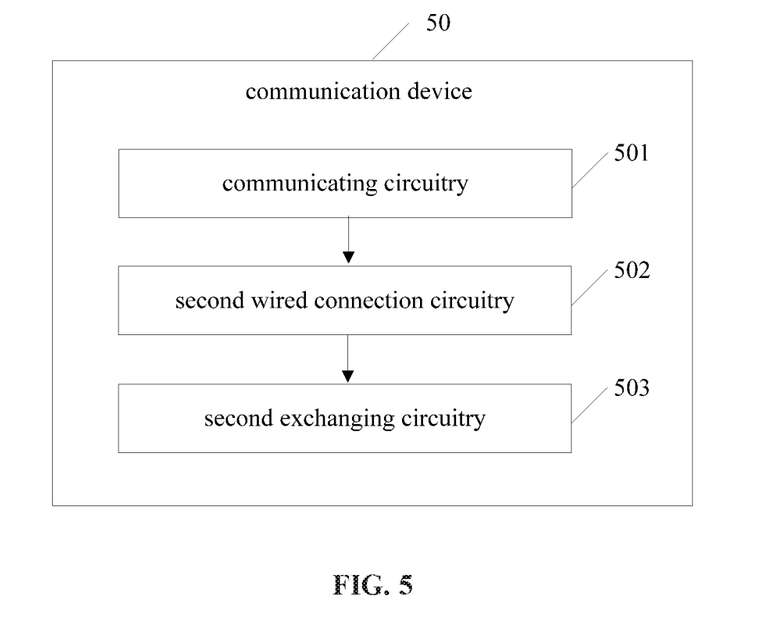
FIG. 5 schematically illustrates a structural diagram of a communication device according to an embodiment of the present disclosure.

Referring to FIG. 5, embodiments of the present disclosure further provide a communication device 50 which includes a communicating circuitry 501, a second wired connection circuitry 502 and a second exchanging circuitry 503.

The communicating circuitry 501 is configured to establish a communication connection with a data source device.

The second wired connection circuitry 502 is configured to establish a second wired connection with at least one other device.

The second exchanging circuitry 503 is configured to exchange identification information with the at least one other device through the second wired connection, thereby the at least one other device receiving communication data sent from the data source device according to the received identification information.

In some embodiments, the communicating circuitry 501 is further configured to establishing a second wireless connection with the at least one other device according to the identification information of the at least one other device, and communicating with the at least one other device through the second wireless connection.

In some embodiments, after establishing a second wireless connection with the at least one other device, the communicating circuitry is further configured to encrypt a data link of the second wireless connection according to the identification information of the at least one other device, and communicate with the at least one other device through the encrypted second wireless connection.

In some embodiments, the communication connection established by the communicating circuitry 501 with the data source device is a first wireless connection; wherein the second exchanging circuitry 503 is further configured to obtain identification information of the data source device; and transmit the identification information of the data source device to the at least one other device through the second wired connection, thereby the at least one other device receiving the communication data sent from the data source device through the first wireless connection according to the received identification information.

In some embodiments, the communication connection established by the communicating circuitry 501 with the data source device is a first wireless connection; wherein the second exchanging circuitry 503 is further configured to obtain identification information of the data source device; transmit the identification information of the data source device to the at least one other device through the second wired connection; and share the first wireless connection with the at least one other device according to the identification information of the at least one other device and the identification information of the data source device.

In some embodiments, the second exchanging circuitry 503 is further configured to share the first wireless connection with the at least one other device according to the identification information of the at least one other device and the identification information of the data source device, which includes at least one of following: a target device and the at least one other device communicating with the data source device in turn; and the target device and the at least one other device communicating with the data source device simultaneously.

In some embodiments, the identification information of the data source includes at least one of the following: an identification code of the data source device, a physical address of the data source device, an encryption key of the data source device, a timing of the first wireless connection, frequency hopping information of the first wireless connection and an encryption key of the first wireless connection.

In some embodiments, the second exchanging circuitry 503 is further configured to disconnect the second wired connection.

In some embodiments, the communication device 50 further includes: a first wired connection circuitry (not shown), configured to establish a first wired connection with the data source device; a first exchanging circuitry (not shown), configured to identification information with the data source device through the first wired connection; and the communicating circuitry 51 is further configured to establish a first wireless connection with the data source device according to the identification information of the data source device.

In some embodiments, the communicating circuitry 501 is configured to encrypt the data link of the first wireless connection according to the identification information of the data source.

In some embodiments, the first exchanging circuitry is further configured to disconnect the first wired connection.

In some embodiments, the second exchanging circuitry 503 is further configured to disconnect the second wired connection.

In some embodiments, the identification information includes at least one of the following: an identification code of a communication device, a physical address of the communication device, and an encryption key of the communication device; and the identification information of the at least one other device includes at least one of the following: an identification code of the at least one other device, the physical address of the at least one other device, and an encryption key of the at least one other device.

Embodiments of the present disclosure further provide a readable storage medium, and the readable storage medium includes a non-transitory storage medium or a non-transitory storage medium which stores computer instructions, wherein once the computer instructions are executed, the communication method provided in above embodiments of the present disclosure is performed.

Embodiments of the present disclosure further provide a communication device, including a memory and a processor, wherein the memory stores computer instructions executable on the processor, and the processor executes the communication method provided in embodiments of the present disclosure.

Those skilled in the art may understand that all or part of steps of above methods may be completed by relevant hardware once the program instruction are executed, and the program may be storage in a computer readable storage medium, such as a Read-Only memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art may modify and vary the embodiments without departing from the spirit and scope of the present disclosure.

What is claimed is:

1. A communication method comprising:
   a target device establishing a communication connection with a data source device;
   establishing a second wired connection with at least one other device;
   exchanging identification information with the at least one other device through the second wired connection; and
   establishing a second wireless connection with the at least one other device according to the identification information of the at least one other device, and communicating with the at least one other device through the second wireless connection, thereby the at least one other device receiving communication data of the data source device which is forwarded by the target device,
   wherein the communication connection established with the data source device is a first wireless connection; and after exchanging identification information with the at least one other device through the second wired connection, the communication method further comprises:
   obtaining identification information of the data source device; and
   transmitting the identification information of the data source device to the at least one other device through the second wired connection.

2. The communication method according to claim 1, wherein after exchanging identification information with the at least one other device through the second wired connection, the communication method further comprises:
   after establishing the second wireless connection with the at least one other device, encrypting a data link of the second wireless connection according to the identification information of the at least one other device, and communicating with the at least one other device through the encrypted second wireless connection.

3. The communication method according to claim 1, wherein the at least one other device receives the communication data sent from the data source device through the first wireless connection according to the received identification information.

4. The communication method according to claim 1, wherein the communication method further comprises:
   sharing the first wireless connection with the at least one other device according to the identification information of the at least one other device and the identification information of the data source device.

5. The communication method according to claim 4, wherein sharing the first wireless connection with the at least one other device according to the identification information of the at least one other device and the identification information of the data source device comprises at least one of following: the target device and the at least one other device communicating with the data source device in turn; and the target device and the at least one other device communicating with the data source device simultaneously.

6. The communication method according to claim 3, wherein the identification information of the data source comprises at least one of the following: an identification code of the data source device, a physical address of the data source device, an encryption key of the data source device, a timing of the first wireless connection, frequency hopping information of the first wireless connection and an encryption key of the first wireless connection.

7. The communication method according to claim 1, wherein establishing the communication connection with a data source device comprises:
   establishing a first wired connection with the data source device;
   exchanging identification information with the data source device through the first wired connection; and
   establishing a first wireless connection with the data source device according to the identification information of the data source device.

8. The communication method according to claim 7, wherein establishing a first wireless connection with the data source device according to the identification information of the data source device comprises:
   encrypting a data link of the first wireless connection according to the identification information of the data source.

9. The communication method according to claim 1, wherein the identification information comprises at least one of the following: an identification code of a communication device, a physical address of the communication device, and an encryption key of the communication device; and the identification information of the at least one other device comprises at least one of the following: an identification code of the at least one other device, a physical address of the at least one other device, and an encryption key of the at least one other device.

10. A communication device comprising:
   a communicating circuitry, configured to establish a communication connection with a data source device;
   a second wired connection circuitry, configured to establish a second wired connection with at least one other device; and
   a second exchanging circuitry, configured to exchange identification information with the at least one other device through the second wired connection, establish a second wireless connection with the at least one other device according to the identification information of the at least one other device, and communicate with the at least one other device through the second wireless connection, thereby the at least one other device receiving communication data of the data source device which is forwarded by the target device,
   wherein the communication connection established by the communicating circuitry with the data source device is a first wireless connection; wherein the second exchanging circuitry is further configured to obtain identification information of the data source device; and transmit the identification information of the data source device to the at least one other device through the second wired connection.

11. The communication device according to claim 10, wherein after the second wireless connection with the at least one other device is established, the communicating circuitry is further configured to encrypt a data link of the second wireless connection according to the identification information of the at least one other device, and communicate with the at least one other device through the encrypted second wireless connection.

12. The communication device according to claim 10, wherein the at least one other device is configured to receive the communication data sent from the data source device through the first wireless connection according to the received identification information.

13. The communication device according to claim 10, wherein the second exchanging circuitry is further configured to share the first wireless connection with the at least one other device according to the identification information of the at least one other device and the identification information of the data source device.

14. The communication device according to claim 10, wherein the second exchanging circuitry is further configured to share the first wireless connection with the at least one other device according to the identification information of the at least one other device and the identification information of the data source device, which comprises at least one of following: the target device and the at least one other device communicating with the data source device in turn; and the target device and the at least one other device communicating with the data source device simultaneously.

15. The communication device according to claim 12, wherein the identification information of the data source comprises at least one of the following: an identification code of the data source device, a physical address of the data source device, an encryption key of the data source device, a timing of the first wireless connection, frequency hopping information of the first wireless connection and an encryption key of the first wireless connection.

16. The communication device according to claim 10, further comprises: a first wired connection circuitry, configured to establish a first wired connection with the data source device; a first exchanging circuitry, configured to identification information with the data source device through the first wired connection; and the communicating circuitry is further configured to establish a first wireless connection with the data source device according to the identification information of the data source device.

17. The communication device according to claim 16, wherein the communicating circuitry is configured to encrypt a data link of the first wireless connection according to the identification information of the data source.

18. The communication device according to claim 10, wherein the identification information comprises at least one of the following: an identification code of a communication device, a physical address of the communication device, and an encryption key of the communication device; and the identification information of the at least one other device comprises at least one of the following: an identification code of the at least one other device, the physical address of the at least one other device, and an encryption key of the at least one other device.

* * * * *